(12) United States Patent
Debaisieux et al.

(10) Patent No.: US 6,929,035 B2
(45) Date of Patent: Aug. 16, 2005

(54) THIN WALLED COMPARTMENTED TUBULAR STRUCTURE AND ITS MANUFACTURING PROCESS

(75) Inventors: Stéphane Debaisieux, Feluy (BE); Dimitri Gueuning, Rixensart (BE); Sébastien Quets, Ittre (BE)

(73) Assignee: Sonaca, S.A., Belgique (BE)

( * ) Notice: Subject to any disclaimer, the term of this patent is extended or adjusted under 35 U.S.C. 154(b) by 146 days.

(21) Appl. No.: 10/170,863

(22) Filed: Jun. 12, 2002

(65) Prior Publication Data

US 2002/0195155 A1 Dec. 26, 2002

(30) Foreign Application Priority Data

Jun. 20, 2001 (BE) .......................................... 2001/0419

(51) Int. Cl.⁷ .............................. F16L 9/19; B21C 37/06
(52) U.S. Cl. ................. 138/115; 138/177; 138/DIG. 11; 285/124.2; 285/133.6; 285/133.11; 72/368; 72/370.23
(58) Field of Search .................................. 138/116, 177, 138/115, DIG. 11, 38, 39; 285/124.2, 133.6, 133.11; 72/368, 370.23

(56) References Cited

U.S. PATENT DOCUMENTS

| | | | | |
|---|---|---|---|---|
| 1,873,815 A | * | 8/1932 | Brouner ...................... 138/115 |
| 2,284,937 A | * | 6/1942 | Wood ....................... 285/122.1 |
| 3,110,754 A | * | 11/1963 | Witort et al. ............. 174/70 R |
| 3,476,869 A | * | 11/1969 | Hawkins ..................... 174/68.3 |
| 3,625,258 A | * | 12/1971 | Phelps ........................ 138/115 |
| 3,927,817 A | * | 12/1975 | Hamilton et al. ........... 228/157 |
| 4,292,375 A | | 9/1981 | Ko |
| 4,461,323 A | * | 7/1984 | Morikawa et al. .......... 138/115 |
| 4,513,601 A | * | 4/1985 | Herbulot ...................... 72/398 |
| 4,603,824 A | | 8/1986 | McArdel |
| 4,752,049 A | | 6/1988 | Cole |
| 5,115,963 A | * | 5/1992 | Yasui ......................... 228/157 |
| 5,300,367 A | | 4/1994 | Bodart et al. |
| 5,807,454 A | | 9/1998 | Kawabe et al. |
| 5,988,225 A | | 11/1999 | Schulz |
| 6,119,978 A | * | 9/2000 | Kobayashi et al. ....... 244/35 R |
| 6,138,898 A | * | 10/2000 | Will et al. .................. 228/157 |
| 6,283,162 B1 | * | 9/2001 | Butler ........................ 138/177 |
| 6,332,302 B1 | * | 12/2001 | Asai .......................... 52/731.6 |
| 6,360,782 B1 | * | 3/2002 | Yoshitoshi et al. ......... 138/115 |
| 6,394,142 B1 | * | 5/2002 | Woelfel et al. ............. 138/115 |
| 6,450,205 B1 | * | 9/2002 | Check ........................ 138/116 |
| 6,575,198 B2 | * | 6/2003 | Yoshitoshi et al. ......... 138/115 |

FOREIGN PATENT DOCUMENTS

GB            2 109 711 A      6/1983

* cited by examiner

*Primary Examiner*—James Hook
(74) *Attorney, Agent, or Firm*—Pearne & Gordon LLP (57) ABSTRACT

Thin walled compartmented tubular structure and its manufacturing process.

The elbow or T-shaped structure, includes an external wall (14) and continuous internal walls (22) made in one piece. This therefore materializes, between the inlet (10) and each outlet (12) of the structure, at least one continuous passage to direct a fluid circulating inside it. The structure according to the invention is manufactured by diffusion welding and superplastic forming, from titanium alloy sheets. One application is for aircraft de-icing circuits.

11 Claims, 5 Drawing Sheets

THIN WALLED COMPARTMENTED TUBULAR STRUCTURE AND ITS MANUFACTURING PROCESS

TECHNICAL BACKGROUND

The invention concerns a thin walled compartmented tubular structure intended to enable a fluid to flow between an inlet tubular part and at least one outlet tubular part, oriented in different directions, generally although not necessarily mutually perpendicular.

In the expression "thin walled compartmented tubular structure", the term "thin" signifies that the structure is formed exclusively of sheet material less than 2 mm thick.

The invention also concerns a manufacturing process for such a thin walled compartmented tubular structure.

The invention has a useful application in the aircraft industry, and in particular for the manufacture of hot air de-icing devices for the external surfaces of aircraft, such as leading edge flaps on aircraft wings. It may however be used in any other technical application requiring a change of direction of a fluid flowing within a pipe.

STATE OF THE ART

On aircraft, hot air is generally bled off the aircraft engines and is used for de-icing or for preventing the accretion of ice on the most exposed aerodynamic surfaces, such as the leading edge of the wings, the tailplane and fins, as well as the engine air intakes. The hot air is directed towards the surfaces to be de-iced by pipes which are interconnected.

Document U.S. Pat. No. 4,752,049 shows an aircraft wing equipped with leading edge flaps, inside of which a de-icing circuit has been deployed. The circuit consists essentially of a tubular pipe which runs along the leading edge of the flaps, a telescopic pipe section which receives the air bled off the engine and an elbow which connects this section to the tubular pipe. The air conveyed by the tubular pipe exhausts via orifices located on its periphery, and is then diffused into a de-icing chamber located inside the leading edge of the flap.

Document U.S. Pat. No. 5,807,454 describes a similar device, used for de-icing the leading edge of a wing.

Document U.S. Pat. No. 4,603,824 shows a de-icing device for a leading edge flap, in which an air supply pipe is connected to a first end of a telescopic pipe by a T-union, the second end of the telescopic pipe being connected to a leading edge pipe via a second T-union. In this device, the telescopic pipe accommodates all the displacements of the flap without interrupting the air supply. Each T-union is supported by two ribs which provide a rigid link to the leading edge pipe whilst at the same time allowing the telescopic pipe to rotate about the supply pipe receiving the hot air from the engine.

In the design of such de-icing circuits for aircraft flaps and wings, the preference is to use lightweight and compact pipes, in order to limit weight. However, permanent distortion or cracking may occur in the leading edge de-icing pipes. In particular, this distortion occurs at the joints between the various sections of these pipes. These problems may be resolved by increasing the thickness and so increasing their stiffness. However, this leads to an increase in weight, which is contrary to the objective for aircraft applications.

Tests have shown that the deterioration of the de-icing pipes is essentially due to the vibrations generated by the hot air flowing through them. Thus, it has been found that the hot air leaving the elbows or T-unions exhibits swirling flow, the speed profile of which is random. This swirling flow generates alternating stresses at the de-icing pipe wall, which may lead to fatigue cracks which are extremely detrimental to safety and to the service life of the constituent parts of the de-icing circuit.

To counter the effects of the swirling flow without excessively affecting the weight or strength of the tubular structure, a known device is to fit inside the outlet parts of the elbows or T-unions, single or crossed plates across a diameter of the outlet of the elbow or T-union, preferably at right angles to one another. These plates are intended to smooth the flow and to reduce the degree of swirling at the inlet of the de-icing pipe. They generate a smoother flow in the longitudinal direction of the pipe.

The use of such plates does however present a disadvantage from the point of view of manufacture. The plates are in fact secured to the circular contours of the elbow or T-union by spot welds. Such an operation involves the use of a tool to position and assemble the various parts, in order to avoid the distortion inherent in welding of narrow gauge materials. Rework is often required to return the parts to the desired dimensions, which is particularly detrimental for manufacturing cycle times.

Another disadvantage concerns the manufacture of thin walled elbow or T-shaped structures, which involve using techniques known to those in the trade, but which are long and costly to implement.

Thus it is possible to form two half-shells by stamping or superplastic distortion, which can then be joined by a fusion welding operation. However, this technique requires as many tools as there are parts to be produced plus a tool for routering and assembling the parts.

It is also known how to produce a T-union by tapping one tube off the other and welding together the said tubes along their line of intersection. This technique presents the same disadvantages as the previous one. Moreover, it involves the use of an elaborate tool to position the tubes prior to assembly and to secure them during the welding operation.

Document U.S. Pat. No. 5,988,225 describes another manufacturing technique for a T-shaped tubular structure, by superplastic distortion of a tube. According to this technique, the ends of a tubular blank are sealed with discs having a higher coefficient of expansion than that of the part to be produced, then the blank is placed in a die. After heating and injection of a gas into one of the ends of the blank, the tube distorts and adopt the internal contour of the die and generate a T-shaped tubular structure.

Compared with the other manufacturing techniques, this last technique presents the advantage of reducing the manufacturing cycle time. However, the latter remains dependent on the constraints associated with fitting the plates or walls which straighten the flow at the outlet from the T-union. It does not therefore satisfactorily solve the problem caused by the generation of a turbulent flow at the outlets from the elbow or T-union.

PRESENTATION OF THE INVENTION

The precise object of the invention is a thin walled compartmented tubular structure whose original design considerably reduces the turbulent flows, without increasing weight, whilst at the same time providing much shorter manufacturing cycle times than when the existing manufacturing techniques are used.

According to the invention, this result is achieved using a thin walled compartmented tubular structure, which enables a fluid to flow between an inlet tubular part and at least one outlet tubular part, oriented in different directions, the said structure having an external wall and being characterised in that it additionally includes continuous internal walls, manufactured in one piece with the external wall, in order to materialise between the inlet tubular part and each outlet tubular part, at least one independent continuous passage for guiding the fluid.

The presence of a continuous passage for guiding the fluid between the inlet and the outlet greatly reduces the turbulence at the outlet of the said structure. This therefore removes any risk of damage to the de-icing pipe.

According to a preferred manufacturing method for the invention, each continuous internal wall includes two planar end portions, located in the tubular inlet and outlet parts, and a curved inner portion, shaped like a cone frustrum, which connects together the two planar end portions without any discontinuity.

Preferably, the tubular structure is formed from sheet material of thickness up to about 2 mm. The internal curved portion of each internal wall thus intercepts a median plane of the tubular structure along a first circular arc of radius R and the external wall along a second circular arc of radius r, such that radius R of the first circular arc is approximately equal to three times the radius r of the second circular arc.

In this case, the radius r of the second circular arc is, preferably, approximately equal to 15 times the thickness of the said sheet material.

Advantageously, if the structure is T-shaped and includes two outlet tubular parts aligned and oriented approximately at right angles to the inlet tubular part, the continuous independent passage connecting together the inlet tubular part to each outlet tubular part is materialised between the external wall and two continuous internal walls.

In this case, preferably, an additional internal wall is placed inside the latter, along a median plane of the latter, between the external wall of the structure and the joint zone of the said continuous internal walls.

Each of these independent continuous passages thus exhibits, between the inlet tubular part and each outlet tubular part, either an approximately constant passage cross-section, or a passage cross-section which increases or decreases gradually in order to accelerate or decelerate the fluid, as the case may be.

The invention also covers a manufacturing process for a thin walled compartmented tubular structure as defined above, in which the external wall and the continuous internal walls are produced in a single operation by diffusion welding and superplastic forming, starting with titanium alloy sheet material.

BRIEF DESCRIPTION OF THE DRAWINGS

A description follows, as a non limiting example, of a preferred production method for the invention, referring to the drawings in the appendix, in which.

DETAILED DESCRIPTION OF A PREFERRED PRODUCTION METHOD FOR THE INVENTION

In the production method illustrated by the figures, the thin walled compartmented tubular structure in accordance with the invention is a T-shaped structure which includes an external wall 14. The external wall 14 of the thin walled compartmented tubular structure in accordance with the invention is formed from a thin gauge sheet, preferably of titanium alloy.

The thin walled compartmented tubular structure includes an inlet tubular part 10 and two outlet tubular parts 12. More precisely, in the inlet 10 and outlet 12 tubular parts, the external wall 14 exhibits a circular section of approximately the same diameter. Moreover, the outlet tubular parts 12 are centred on a common axis 18, oriented in a direction approximately normal to the axis 20 of the inlet tubular part 10.

It is important to note that these characteristics should not be considered as limiting the scope of the invention. In particular, the latter covers also an elbow-shaped thin walled compartmented tubular structure having only one outlet tubular part, a thin walled compartmented tubular structure in which the external walls of the inlet and outlet tubular parts have non circular sections (e.g. oval) and/or different sections, and a thin walled compartmented tubular structure in which the axes of the inlet and outlet tubular parts are oriented in different directions, but not orthogonal one with respect to the other.

In accordance with the invention, the thin walled compartmented tubular structure includes, additionally, continuous internal walls 22, produced in one piece with the external wall 14. The continuous internal walls 22 extend without interruption from the inlet tubular part 10 to each outlet tubular part 12, materialising an independent continuous passage 24 between the inlet tubular part 10 and each outlet tubular part 12.

Figure 1:
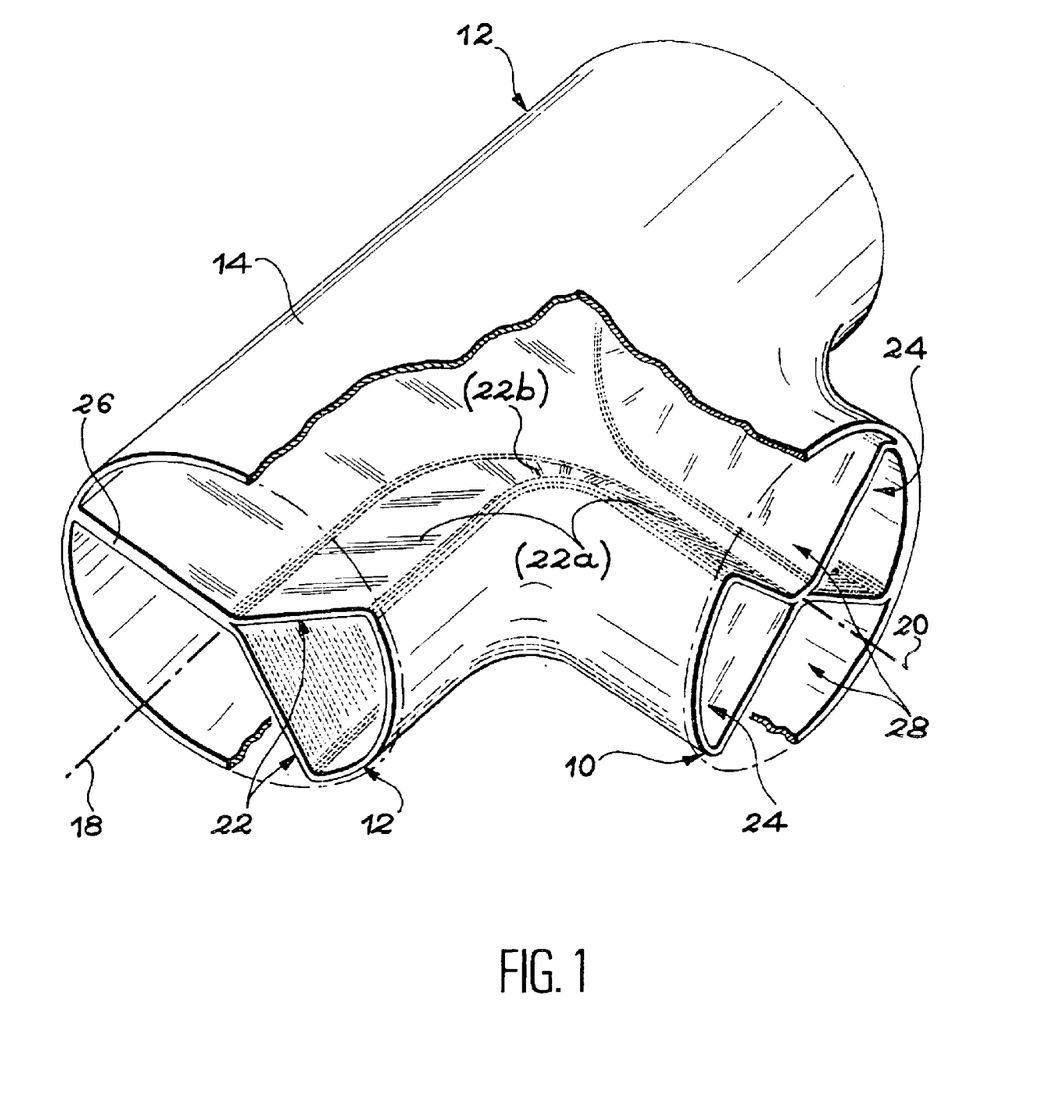
FIG. 1 is a cut-away view in perspective which represents a T-shaped thin walled compartmented tubular structure, according to a preferred production method for the invention

Thus, in the production method represented in FIG. 1 where the tubular structure is T-shaped, the continuous internal walls 22 materialise two continuous independent passages 24 connecting respectively the inlet tubular part 10 to each of the outlet tubular parts 12. Like the external wall 14, the continuous internal walls 22 are made from thin sheet material, preferably titanium alloy.

In the production method illustrated in FIG. 1, each continuous internal wall 22 includes two planar end portions 22a and an intermediate curved portion 22b, shaped like the frustrum of a cone, connecting the two planar end portions 22a without any discontinuity, i.e. tangentially.

The two planar end portions 22a on each of the walls 22 are oriented approximately radially within the inlet tubular parts 10 and outlet tubular parts 12, symmetrically relative to a median plane of the tubular structure, the said median plane passing through axes 18 and 20.

The curved intermediate portion 22b intersects the above-mentioned median plane in a circular arc of radius R and the external wall 14 in a circular arc of radius r. The preferred values to be allocated to these radii R and r will be specified later.

More precisely, each of the independent continuous passages 24 is materialised, on the one hand, by two continuous internal walls 22 and, on the other hand, by a portion, of circular arc cross-section, of the external wall of the tubular structure. Each of these passages 24 thus exhibits a cross-section in the shape of a sector of a circle.

The two continuous internal walls 22 materialising each of the passages 24 are arranged symmetrically on either side of the median plane of the tubular structure, such as to form a given angle between them. This angle may be approximately the same from one end of the passage 24 to the other or, on the contrary, varying, the same applies to the joint line between the walls 22 relative to the axis 18, at the outlet of the tubular structure.

Thus, the angle formed between the continuous internal walls 22 may decrease or increase from the inlet tubular part 10 to the outlet tubular part 12. Similarly, the joint line of the continuous internal walls 22 may also move away from the axis 18 of the outlet tubular parts 12. In this way, the value of the cross-section of the passages 24, may decrease or, on the contrary, increase from the inlet end to the outlet end. This therefore accelerates or decelerates the fluid flowing inside the passage 24. In the production method illustrated schematically in FIG. 1, the angle formed between the continuous internal walls 22 which materialise each passage 24, is, for example, about 90°.

The hot air entering each of the passages 24 gradually changes direction towards the outlet of the said passage via the intermediate curved portions, shaped like the fulcrum of a cone, of the walls 22. The continuous and gradual nature of the change in direction thus impelled upon the air flowing through the passages 24 consequently avoids the formation of turbulence at the outlet from the structure. This therefore avoids the appearance of severe vibrations liable to generate cracks.

In the production method represented in FIG. 1, the thin walled compartmented tubular structure additionally includes an additional internal wall 26. This additional wall 26 is located along the median plane of the structure, such as to connect together without any discontinuity the external wall of the said structure to the joint zone of the continuous internal walls 22, outside the passages 24. This thus materialises on either side of the additional wall 26, two more passages 28 through which the inlet tubular part 10 communicates simultaneously with each of the outlet tubular parts 12.

The hot air entering the inlet of each of the passages 28 is therefore split in two when it makes contact with the external wall of the structure, opposite the inlet tubular part 10. However, due to the presence of the continuous passages 22, only about half the fluid in fact impinges on the said external wall. The resulting impact, which generates vibrations, is therefore diminished relative to existing structures, in which the entire fluid flow impinges the said wall. Moreover, the fluid leaving the passages 28 is entrained and regulated by the fluid leaving the continuous passages 24, such that the fluid flowing from the outlet of the structure is practically turbulence free.

This effect may be increased, if necessary, by providing the continuous passages 24 with larger inlet cross-sections than the passages 28. In this case it is also advantageous to increase the cross-section of the continuous passages 24 downstream of their inlet, in order to direct a larger amount of guided fluid to the outlet.

Figure 5:
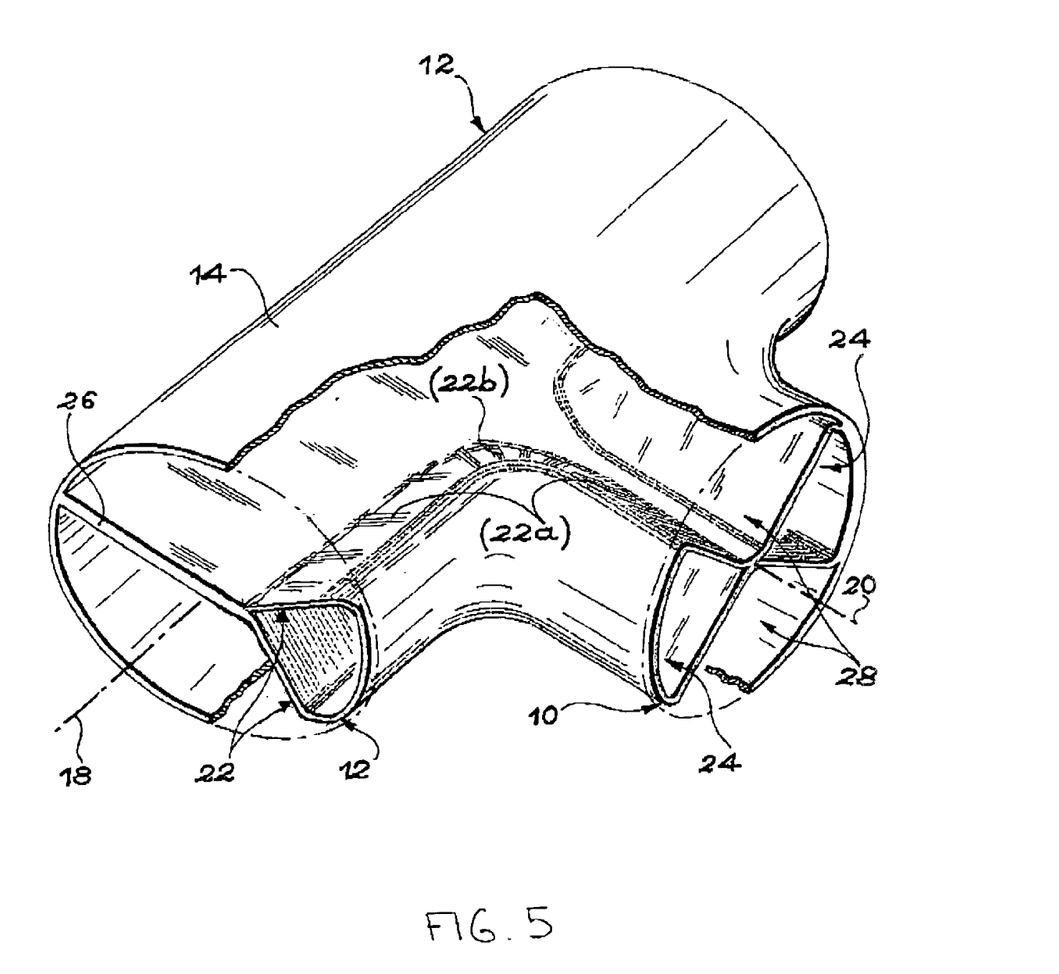
FIG. 5 is a cut-away view in perspective which represents a T-shaped thin walled compartmented tubular structure, according to a preferred production method for the invention.

It should be noted that the stabilising effect on the flow leaving the passages 28 by the flow leaving the continuous passages 24 is further increased if the latter are given a cross-section which reduces gradually from the inlet to the outlet as illustrated in FIG. 5. In fact, such an arrangement effectively increases the speed of the fluid at the outlet of the passages 24, and consequently, the kinetic energy which is available to entrain and regulate the turbulent flow at the outlet of passages 28.

However, it is desirable to limit the speed differences between the outlets of passages 24 and 28, in order to avoid generating turbulence. To that end, the ratios of the cross-sections of the inlets and outlets of passages 24 and 28 are adjusted in order to best balance the speeds at the outlet of the tubular structure.

The continuous internal walls 22 form in cross-section, in the inlet tubular part 10, an X or a four-branch cross. The air flow entering the structure is therefore split into four parts. In each of the outlet tubular parts, the two walls 22 materialising the passage 24 which exits there, together with the additional wall 26, form in cross-section a Y or three-branch cross.

Figure 2:
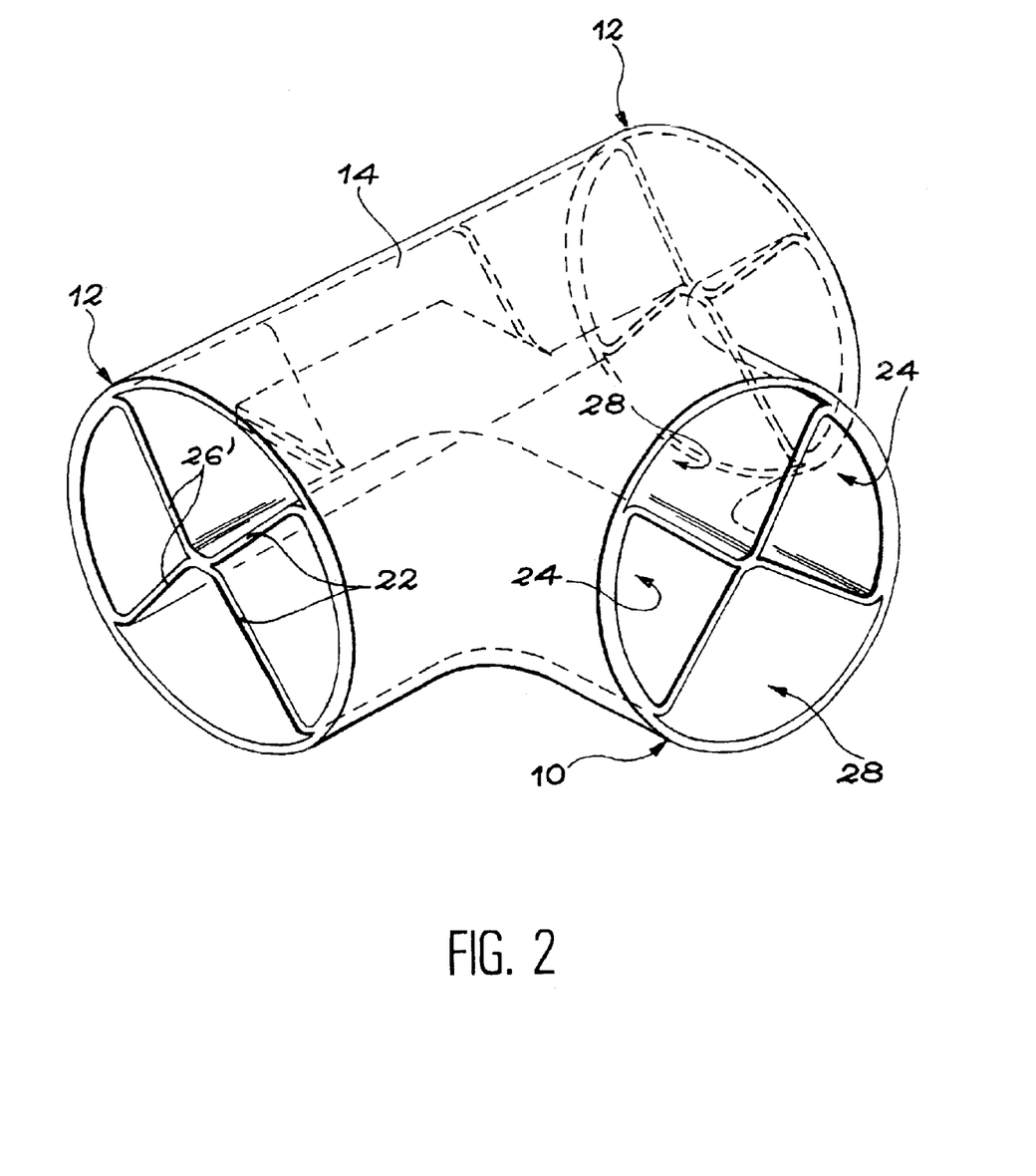
FIG. 2 is view in perspective, comparable to FIG. 1, showing a production variant.

In a production variant of the invention, illustrated in FIG. 2, the additional wall 26 is replaced by two pairs of continuous internal walls 26' which connect the joint zones of the continuous internal walls 22 to the external wall 14 of the structure, in order to re-direct, to each of the outlets of the tubular structure, the fluid entering the inlet of each of the passages 28. The walls 26' are arranged symmetrically in relation to the median plane of the structure. Together with the walls 22, they form in cross-section an X in the outlet tubular parts 12 of the structure.

This arrangement provides the means of guiding to the outlet all the fluid entering the structure. This provides an even greater flow stability.

In this latter variant, as in the production method described previously, the angles formed between the different walls 22 and 26' may be constant or varying between the inlet and the outlet of the structure, in order to provide them with the desired characteristics.

For reasons associated with the manufacturing process for the compartmented tubular structure in accordance with the invention, the additional wall 26 as well as the portions of the external wall 14 materialising the passages 24 are approximately double the thickness of the internal continuous walls 22 and of the other portions of the external wall 14 of the structure.

Figure 3:
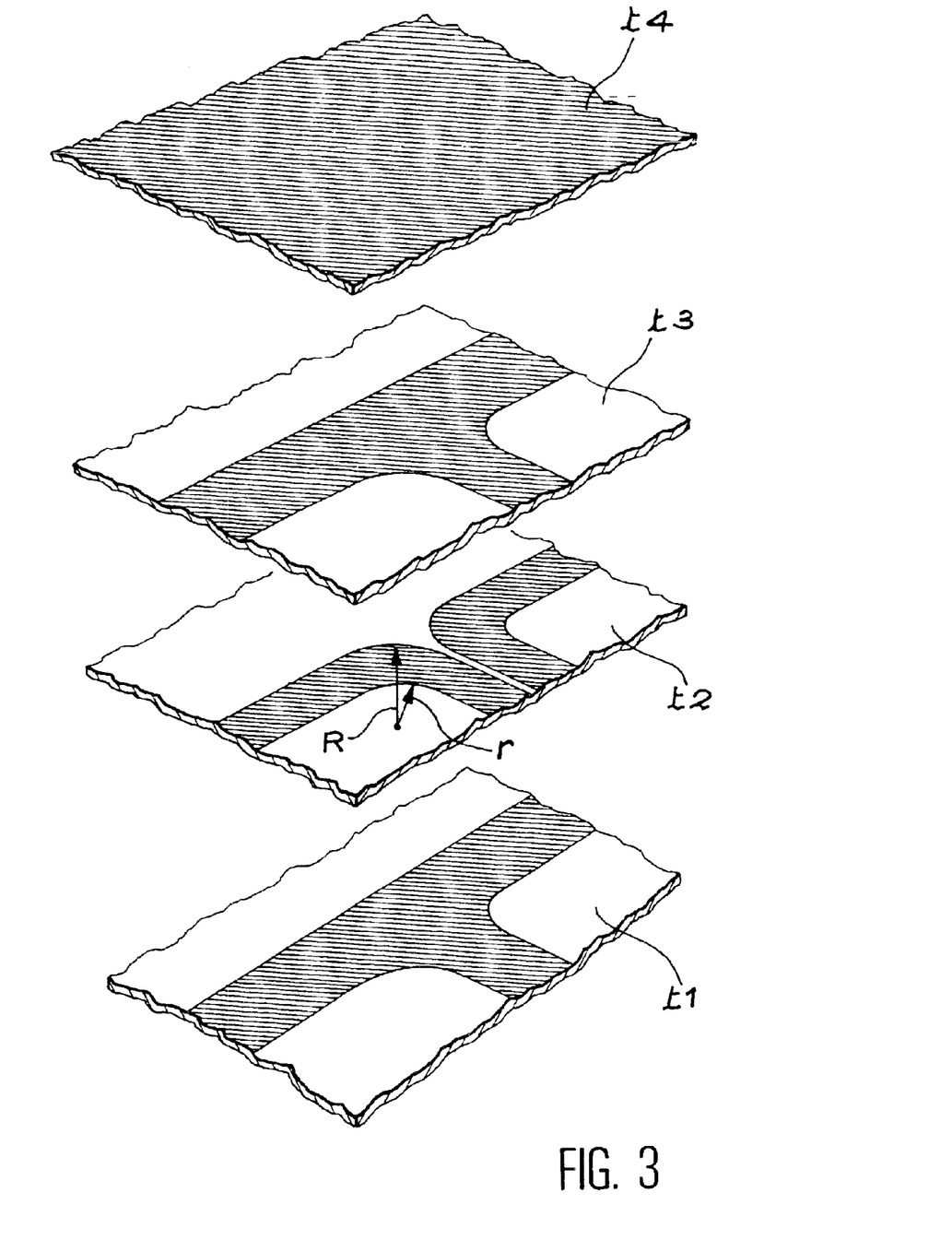
FIG. 3 is a view in perspective showing schematically a first manufacturing stage of the thin walled compartmented tubular structure illustrated in FIG. 1.
Figure 4:
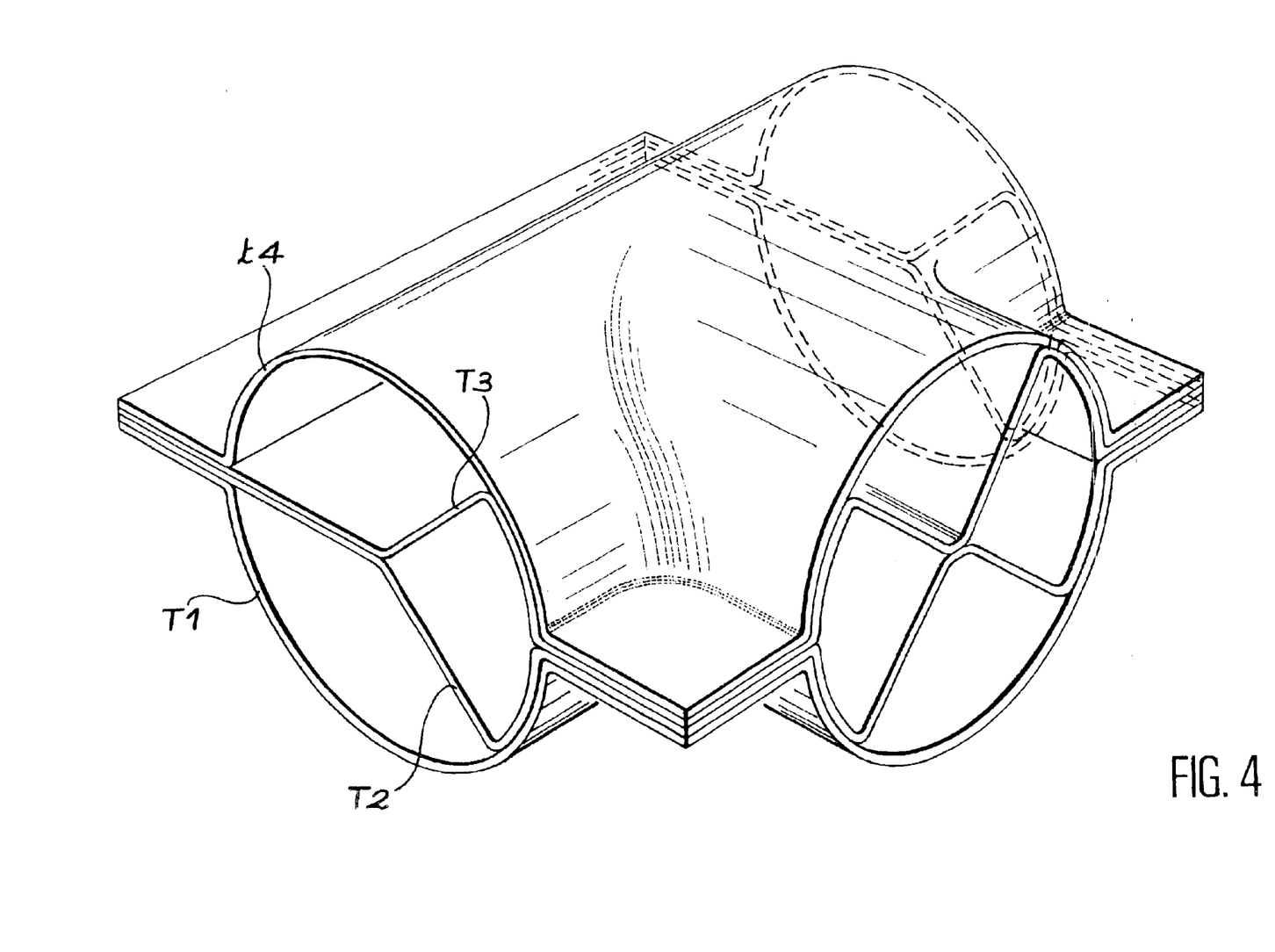
FIG. 4 is a view in perspective showing schematically a second manufacturing stage of the thin walled compartmented tubular structure illustrated in FIG. 1.

In the preferred production method for the invention, illustrated in FIGS. 3 and 4, the compartmented tubular structure is manufactured by diffusion welding and superplastic forming.

In accordance with this process and as illustrated in FIG. 3, a stack of four titanium alloy sheets t1, t2, t3 and t4 is first produced.

More precisely, sheets t1 and t4, placed on the outside of the stack, are intended to form the external wall 14 of the structure to be produced, whereas sheets t2 and t3 placed on the inside of the stack are intended to form the walls 22 and 26. Thus, each of the sheets t2 and t3 forms one of the walls 22 materialising each of the passages 24 and the two sheets t2 and t3 are welded together to form the additional wall 26. Additionally, sheet t2 is welded locally to sheet t1 and sheet t3 is locally welded to sheet t4, such as to form the parts of the external wall 14 of the structure, which materialise the passages 24.

Prior to implementing the manufacturing process, sheets t1 to t4 are subjected to a certain number of preparatory operations, well-known in the trade. These operations include in particular, routering of the sheets, an alkaline degrease followed by a fluo-nitric strip and masking of the weld zones. This masking is achieved by depositing masks on the mating faces of sheets t1 to t4, by engraving the masks on the zones not to be welded and coating the zones thus unmasked with an anti-diffusion material such as boron nitride. In FIG. 3, the zones coated with anti-diffusion material are shown by cross-hatching.

An important characteristic of the process is the application of the anti-diffusion material on sheets t2 and t3 which form the internal walls 22 and 26 of the structure. The forming of the intermediate portions, in the shape of the fulcrum of a cone, of each of the walls 22 involves the deformation of the corresponding sheet t2 or t3 in three dimensions. This deformation is obtained without generating any cracks or tears, by depositing the anti-diffusion material on the masked zone towards the inside of sheets t2 and t3 in an optimised circular arc of radius R, which acts as the start line for the deployment of the wall 22.

For sheets t2 and t3 which have an initial constant thickness e, at the most equal to about 1 mm, radius R is equal to about three times radius r of the circular arc which limits the anti-diffusion zone to the outside of sheets t2 and t3.

In a preferred production method, radius r is approximately equal to 15 times thickness e, in order to obtain a compartmented tubular structure whose external diameter is equal to 60 times thickness e. This value is particularly suited to the case of pipes for fitting to aircraft.

Sheets t1 to t4 thus prepared and stacked are then placed in a die. A pressure of 12 bar is then applied to the stack for 5 hours, in order to weld the sheets by diffusion, outside the zones coated with anti-diffusion material.

The superplastic forming cycle is then performed in the usual way, to "inflate" the structure by injection of a gas under pressure between the sheets. The pressure applied to the internal faces of the sheets must reach at least 30 bar for the conforming operation. This stage is illustrated schematically in FIG. 4.

Finally, the parts of the sheets located in the median plane on the outside of the structure are cut away and the corresponding edge is ground to provide the structure with its definitive shape.

Thus, in a single operation, and without generating any cracks, it is possible to form a compartmented tubular structure for redirecting the flow of a fluid without causing any turbulence at the outlet.

What is claimed is:

1. Thin walled compartmented tubular structure enabling a fluid to flow between an inlet tubular part and at least one outlet tubular part oriented in different directions, the said structure consisting of: an external wall and continuous internal walls produced in one piece with the external wall, such as to materialise between the inlet tubular part and each outlet tubular part at least one independent continuous passage to guide the fluid, wherein the internals walls are formed in an X-shaped cross-section in the inlet tubular part and an X-shaped or Y-shaped cross section in each outlet tubular part.

2. Thin walled compartmented tubular structure in accordance with claim 1, in which each continuous internal wall includes two planar end portions, located in the inlet tubular part and outlet tubular part, and an internal curved portion, in the shape of the fulcrum of a cone, connecting together the two planar end portions without any discontinuity.

3. Thin walled compartmented tubular structure in accordance with claim 2, including two outlet tubular parts aligned and oriented approximately at right angles to the inlet tubular part, in which the independent continuous passage connecting the inlet tubular part to each outlet tubular part is materialised between the external wall and two continuous internal walls.

4. Thin walled compartmented tubular structure in accordance with claim 1, in which each of the independent continuous passages exhibits an approximately constant passage cross-section between the inlet tubular part and each outlet tubular part.

5. Thin walled compartmented tubular structure enabling a fluid to flow between an inlet tubular part and at least one outlet tubular part oriented in different directions, the said structure including an external wall and additionally including continuous internal walls produced in one piece with the external wall, such as to materialise between the inlet tubular part and each outlet tubular part at least one independent continuous passage to guide the fluid, in which each continuous internal wall includes two planar end portions, located in the inlet tubular part and outlet tubular part, and an internal curved portion, in the shape of the fulcrum of a cone, connecting together the two planar end portions without any discontinuity, and wherein the thin walled compartmented tubular structure is formed of sheets of thickness equal to about 2 mm at the most, in which the internal curved portion of each continuous internal wall intercepts a median plane of the tubular structure along a first circular arc of radius R and the external wall along a second circular arc of radius r, such that the radius R of the first circular arc is approximately equal to three times radius r of the second circular arc.

6. Thin walled compartmented tubular structure in accordance with claim 5, in which radius r of the second circular arc is approximately equal to 15 times the thickness of the said sheets.

7. Thin walled compartmented tubular structure enabling a fluid to flow between an inlet tubular part and at least one outlet tubular part oriented in different directions, the said structure including an external wall and additionally including continuous internal walls produced in one piece with the external wall, such as to materialise between the inlet tubular part and each outlet tubular part at least one independent continuous passage to guide the fluid, in which each continuous internal wall includes two planar end portions, located in the inlet tubular part and outlet tubular part, and an internal curved portion, in the shape of the fulcrum of a cone, connecting together the two planar end portions without any discontinuity, including two outlet tubular parts aligned and oriented approximately at right angles to the inlet tubular part, in which the independent continuous passage connecting the inlet tubular part to each outlet tubular part is materialised between the external wall and two continuous internal walls, in which an additional internal wall is located inside the structure, in a median plane of the latter, between the external wall of the structure and the joint zones of the said continuous internal walls.

8. Thin walled compartmented tubular structure enabling a fluid to flow between an inlet tubular part and at least one outlet tubular part oriented in different directions, the said structure including an external wall and additionally including continuous internal walls produced in one piece with the external wall, such as to materialise between the inlet tubular part and each outlet tubular part at least one independent continuous passage to guide the fluid, in which each continuous internal wall includes two planar end portions, located in the inlet tubular part and outlet tubular part, and an internal curved portion, in the shape of the fulcrum of a cone, connecting together the two planar end portions without any discontinuity, including two outlet tubular parts aligned and oriented approximately at right angles to the inlet tubular part, in which the independent continuous passage connecting the inlet tubular part to each outlet tubular part is materialised between the external wall and two continuous internal walls, in which two other pairs of internal walls connect the joint zones of the continuous internal walls to the external wall of the structure, such as to re-direct to the outlet the fluid entering via other passages inside the said external wall.

9. Thin walled compartmented tubular structure enabling a fluid to flow between an inlet tubular part and at least one outlet tubular part oriented in different directions, the said structure including an external wall and additionally including continuous internal walls produced in one piece with the external wall, such as to materialise between the inlet tubular part and each outlet tubular part at least one independent continuous passage to guide the fluid, in which each continuous internal wall includes two planar end portions, located in the inlet tubular part and outlet tubular part, and an internal curved portion, in the shape of the fulcrum of a cone, connecting together the two planar end portions without any discontinuity, including two outlet tubular parts aligned and oriented approximately at right angles to the inlet tubular part, in which the independent continuous passage connecting the inlet tubular part to each outlet tubular part is materialised between the external wall and two continuous internal walls, in which at least one of the independent continuous passages exhibits a passage cross-section which reduces gradually between the inlet tubular part and each outlet tubular part.

10. Thin walled compartmented tubular structure enabling a fluid to flow between an inlet tubular part and at least one outlet tubular part oriented in different directions, the said structure including an external wall and additionally including continuous internal walls produced in one piece with the external wall, such as to materialise between the inlet tubular part and each outlet tubular part at least one independent continuous passage to guide the fluid, in which each continuous internal wall includes two planar end portions, located in the inlet tubular part and outlet tubular part, and an internal curved portion, in the shape of the fulcrum of a cone, connecting together the two planar end portions without any discontinuity, including two outlet tubular parts aligned and oriented approximately at right angles to the inlet tubular part, in which the independent continuous passage connecting the inlet tubular part to each outlet tubular part is materialised between the external wall and two continuous internal walls, in which at least one of the independent continuous passages exhibits a passage cross-section which increases gradually between the inlet tubular part and each outlet tubular part.

11. Manufacturing process for a thin walled compartmented tubular structure enabling a fluid to flow between an inlet tubular part and at least one outlet tubular part oriented in different directions, the said structure consisting of: an external outer most wall and continuous internal walls produced in one piece with the external wall, such as to materialise between the inlet tubular part and each outlet tubular part at least one independent continuous passage to guide the fluid, in which the external wall and the internal continuous walls are obtained in a single operation by diffusion welding and superplastic forming, from titanium alloy sheets.

* * * * *

UNITED STATES PATENT AND TRADEMARK OFFICE
CERTIFICATE OF CORRECTION

PATENT NO. : 6,929,035 B2 Page 1 of 1
DATED : August 16, 2005
INVENTOR(S) : Debaisieux et al.

It is certified that error appears in the above-identified patent and that said Letters Patent is hereby corrected as shown below:

Title page,
Item [57], ABSTRACT, delete and insert the following:
-- A thin walled compartmented tubular structure includes an elbow or T-shaped structure. The structure includes an external wall and continuous internal walls manufactured as one piece. Thus, at least one continuous passage is provided between the inlet and each outlet of the structure to direct a fluid circulating therein. The structure is manufactured by diffusion welding and superplastic forming from titanium alloy sheets. The structure can be utilized for aircraft de-icing circuits. --.

Signed and Sealed this

Tenth Day of January, 2006

JON W. DUDAS
*Director of the United States Patent and Trademark Office*